Sept. 18, 1956   R. B. SMITH   2,763,551
PRINTING COLOR STEREO IMAGES ONTO LENTICULAR FILM
Filed Nov 30, 1953   2 Sheets-Sheet 1

11 Green sensitive
12 Red sensitive
13 Blue sensitive

Robert B. Smith
INVENTOR.
BY Daniel J. Mayn
R. Frank Smith
ATTORNEYS

United States Patent Office 2,763,551
Patented Sept. 18, 1956

2,763,551

PRINTING COLOR STEREO IMAGES ONTO LENTICULAR FILM

Robert B. Smith, Rochester, N. Y., assignor to Eastman Kodak Company, Rochester, N. Y., a corporation of New Jersey Application November 30, 1953, Serial No. 394,916

1 Claim. (Cl. 95—2)

This invention relates to photography and particularly to an optical system for printing stereo color images onto lenticular film.

The use of lenticular film for recording black-and-white stereoscopic images is well known and the use of lenticular film for producing color stereo pictures has also been suggested. When multilayer film is used for this purpose, that is, film having on the side opposite the embossings, two or more superposed emulsion layers sensitive to different regions of the spectrum, difficulties arise because of the failure of the embossings or lenticules on the film to focus the color separation images in more than one emulsion layer. Since the focal length of the embossed lens is fixed the image can be recorded sharply in only one layer of the multilayer film. The unsharp wider image in the other layers will then result in mixing of the right eye and left eye images and in other undesirable effects.

These undesirable effects cannot be overcome merely by stopping down the printing aperture because to produce successful color stereo pictures it is necessary to have the two images (right eye and left eye) practically fill the region behind the lenticule.

It is therefore an object of the present invention to provide an optical system for printing stereoscopic separation images in color onto multilayer lenticular film without undesirable mixing or degradation of the images. A further object is to provide a novel method for printing color stereoscopic images on multilayer lenticular film. Other objects will appear from the following description of my invention.

These objects are accomplished in general by using in the optical system a special filter having colored bands which limit the light rays printing the lower emulsion layers, to a narrower region than the light rays printing the upper layer or layers of the film. By "upper layer" I mean the layer nearest the printing light and therefore nearest the embossings of the film, that is, the layer adjacent the support.

Figures 1, 2:
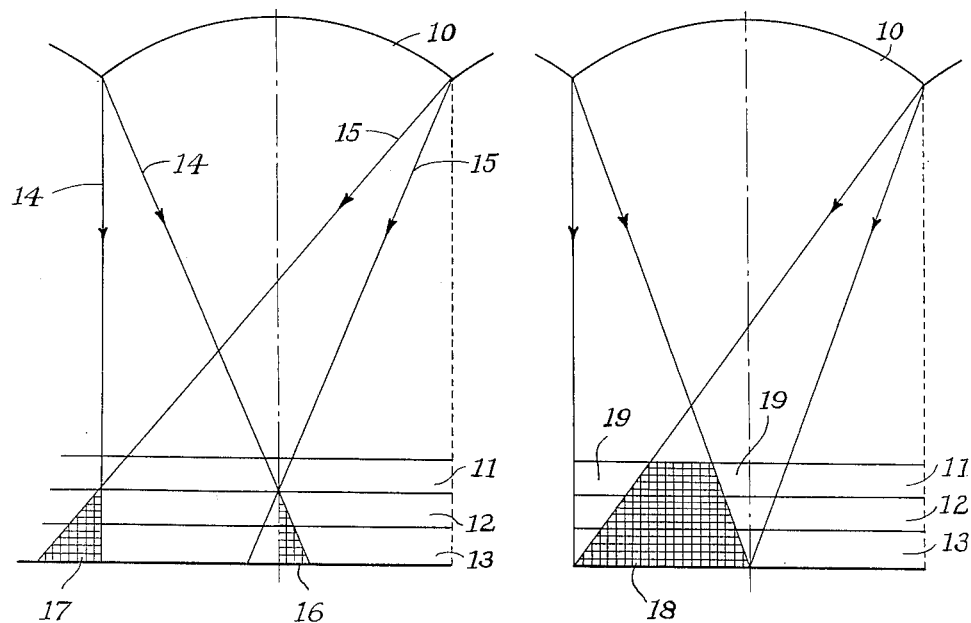
Figures 1, 2 and 3 are enlarged sectional views of multilayer lenticular film showing the effect of various ways of focusing the printing light in the different layers of the film.

The manner in which the optical printing system operates according to my invention will be readily apparent from the following detailed description, in which my invention is described by reference to the various figures of the drawing.

In printing onto any lenticular film the size of the image produced in the emulsion layer is dependent upon the focal length of the lenticule and the position and dimensions of the stop in the light system which is imaged on the film. In a lenticular film having only a single emulsion layer it is, of course, the practice to focus the light rays in the plane of the emulsion layer. In the case of a film having two or more emulsion layers it is possible by regulating the focal length of the embossed lens, to focus the light rays in the layer nearest the base or in the middle emulsion layer or in the emulsion layer farthest from the base. It is apparent that the images formed a little ahead of or a little behind will be somewhat larger than the image itself. For example, if the optical focus is in the top layer the images formed in the middle and bottom layers will be increasingly larger than the image in the top layer and if the focus is in the middle layer the images formed in the top and bottom layers will be somewhat larger than the image in the middle layer.

The result of this spreading of the images is illustrated in Figures 1 and 2 of the drawing. A lenticular film 10 has emulsion layers 11, 12 and 13 thereon, these emulsion layers being effectively sensitive to different spectral regions, usually red, green and blue, in any desired order. A section of the film under one lenticule is shown in enlarged form. Rays of light entering this film from the embossed side during printing are shown at 14 and 15, only the limiting rays at the edges of the lenticule being shown for purposes of illustration. Assuming that these rays are focussed at the bottom of layer 11 it will be seen that rays 14 spread into the adjacent area of layers 12 and 13 as shown at 16 and rays 15 spread into the adjacent area under the adjacent lenticule as shown at 17. This obviously degrades the image by producing fringing or ghost images since the image representing the right eye or left eye stereo separation should be recorded only in the emulsion layers under one-half of the lenticule. In addition to the fringing produced in this way due to the angle at which the printing light rays enter the emulsion layers, additional scattering is produced because of the turbidity of the emulsion layers. This effect also tends to enlarge the images beyond their desired geometric size.

If the printing light rays are focussed at the bottom of the bottom layer 13 instead of in the top layer, another effect is produced as illustrated in Figure 2. In a negative process the area 18 is fully printed but the areas 19 receive less exposure and therefore tend to produce white or light areas which desaturate and degrade the color upon projection of the resulting film.

Figure 3:
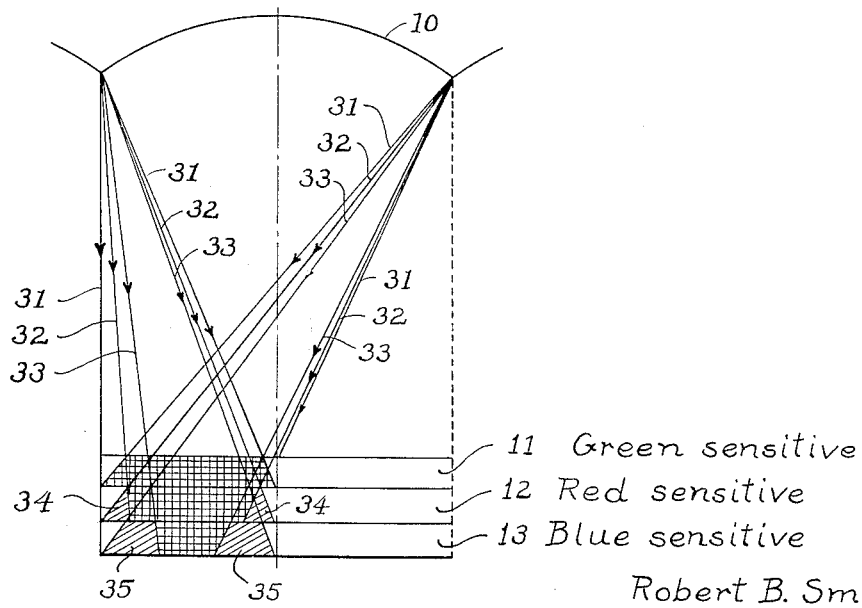
Figure 4:
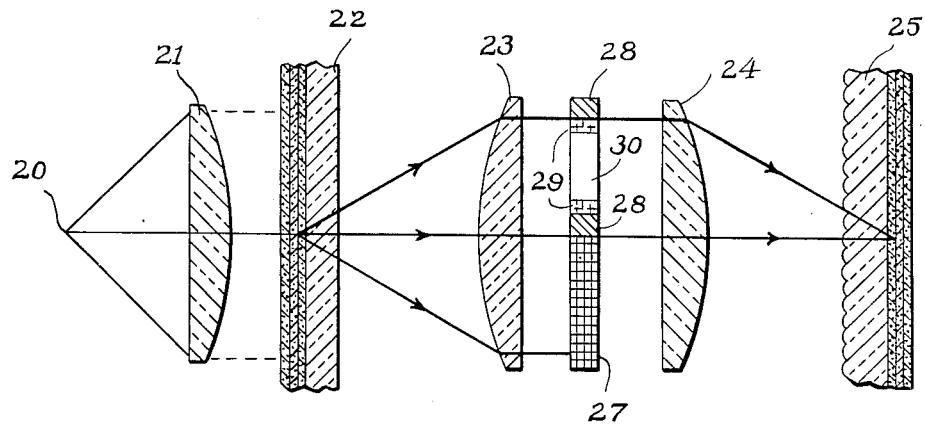
Figure 4 is a schematic diagram, partly in section, of the optical arrangement used for printing.

I propose to overcome these defects by the use of a special filter in the optical system, to limit the light rays printing the bottom layers to a narrower region than that printing the top layer, as illustrated in Figures 3 and 4 of the drawing. In the optical system shown in Fig. 4, light from the source 20 which is any suitable source of high intensity illumination such as a tungsten lamp is imaged by means of a condenser 21 through the stereo separation film 22 which is an original natural color image on multilayer film or other natural color image, representing either the right eye or left eye stereo separation. The original film 22 is imaged by a pair of objectives 23 and 24 onto the copy film 25. Objective lens 24 also functions to present a virtual image of the stops to the embossed lenses on the film at a distance that corresponds to the filter position used in projection of the stereo image.

Filter 27 which I will now describe has an opaque lower portion 27 and an upper portion comprising colored bands 28 and 29 which in the preferred embodiment of my invention are green and yellow, respectively, and a clear portion 30. This filter is used during printing one of the stereo separation images on the film 25. In printing the other stereo separation image the positions of filter 27 would be reversed, that is, the opaque portion would be above, and the colored and clear portions 28, 29 and 30 would be below in the drawing.

Figures 5, 6, 7:
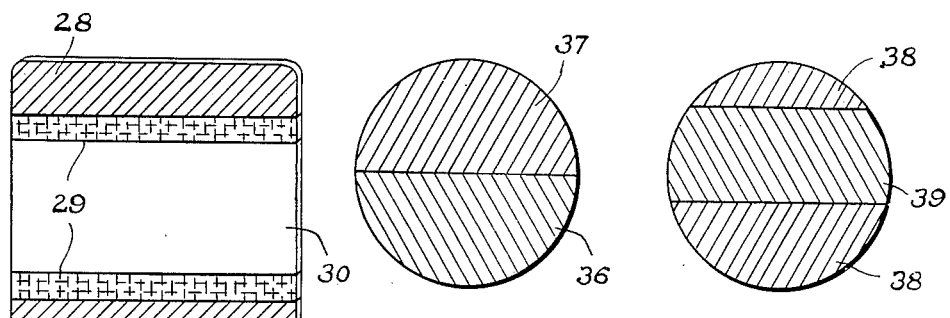
Figure 5 is a perspective view of a filter which may be used according to my invention.
Figures 6 and 7 are plan views of types of polarizing filters which can be used in projecting the film printed according to my invention.

A perspective view of the upper portion of filter 27 is shown in Figure 5 of the drawing. This filter portion may be square in general outline as shown in Figure 5 or it may be rectangular, circular or any other suitable configuration. The linear bands 28 and 29 on this filter are in pairs in which the same color is outermost, the same but a different color is adjacent would be used for printing a three-layer film. It is apparent that a filter having only two bands of the same color might be used for printing two-layer film or a filter with a greater number of bands of different color may be used for printing film having more than three emulsion layers. This filter has bands 28 which transmit green light and absorb red and blue light and bands 29 which transmit yellow light and absorb blue light. This arrangement is used in the preferred embodiment of my invention in which the emulsion layer nearest the support is green-sensitive, the middle layer red-sensitive and the outer layer blue-sensitive. Other colors would, of course, be used with other emulsion sensitivity arrangements as explained more fully hereinafter.

The effect of the filter portion shown in Figure 5 is to narrow the angle at which light rays affecting the low emulsion layers or layers farthest from the embossings of the film, enter the emulsion layers. For example, the green portions 28 of the filter absorb both red and blue light which record in layers 12 and 13 of the film and therefore effectively narrow the stop opening with respect to these layers. Filter portions 29 which are yellow and absorb blue light which records in the bottom layer 13 effectively narrow the stop opening still more with respect to the bottom layer 13 and narrow the printing light beam still more with respect to the bottom emulsion layer.

The effect of this narrowing of the printing light beams is shown in Figure 3 of the drawing. When the filter portion shown in Figure 5 is used in the printing light beam with film having emulsion layers 11, 12 and 13 effectively sensitive to green, red and blue light, respectively, the top emulsion layer 11 is printed in the full width of the printing aperture since green light passes through both the green filter portion 28 and the yellow filter portion 29 as well as the clear portion 30. Thus the green printing rays illustrated at 31 in Figure 3 print at the full width of the top emulsion layer 11, it being assumed that these rays are focussed at the bottom of emulsion layer 11. Red light rays which record in the middle emulsion layer 12 cannot, however, pass through the green filter portion 28 but are transmitted by the yellow filter portion 29 and the clear filter portion 30. The red rays illustrated at 32 in Figure 3 therefore are limited so as to affect an area of emulsion layer 12 equal to one-half the width of an embossed lens and are not permitted to spread into the adjacent areas of the emulsion layers. The blue light rays which affect the bottom emulsion layer 13 cannot pass through either the green filter portion 28 or the yellow filter portion 29 and are therefore restricted to the clear filter portion 30. This effectively narrows these rays so that the blue printing rays 33 reach the bottom of emulsion layer 13 at the correct point and cannot spread into adjacent emulsion areas.

This narrowing of the printing light beam affecting emulsion layers 12 and 13 reduces exposure in areas 34 in emulsion layers 12 and areas 35 in emulsion layer 13, resulting in a penumbra region in these emulsion layers. However, because of emulsion turbidity, these regions 34 and 35 tend to fill in so that they are not underexposed in practice.

I have described printing only one of the stereo color separation images, either right eye or left eye, onto the lenticular film. It is apparent that the other stereo separation image would be printed onto the remaining emulsion areas by a successive printing in any suitable manner, with the stop 27 in Figure 4 reversed as described above.

It has also been assumed for simplicity of illustration that the stereo separation images would be printed in only two adjacent areas of the emulsions, and would be projected by using the polarizing filter shown in Figure 6 in which the light from the left eye image would pass through portion 36 and the light from the right eye image would pass through portion 37 of the polarizing filter, the axes of polarization of portions 36 and 37 being at right angles to each other. If the composite image is projected on a non-depolarizing screen and viewed through analyzing spectacles with properly oriented polarizing filters the left eye would see only the left eye image and the right eye would see only the right eye image thus giving the correct condition for stereo viewing. Other filter arrangements may be used. The polarizing filter shown in Figure 6 might be stopped down vertically to avoid any further danger of mixing of the two images under adjacent embossed elements. Multiple image arrangements might also be used employing a filter such as that image would pass through filter portions 38 oriented in illustrated in Figure 7. As shown therein the right eye image would pass through filter portions 38 oriented in one direction and the left eye image would pass through filter portions 39 oriented at right angles to it. In using this arrangement the images on the lenticular film would be in corresponding positions in the emulsion layers, that is, there would be three separate areas under each lenticule, two for the right eye image and one, between these two, for the left eye image. Other multiple filter arrangements can be used as a further aid in preventing mixing of the component images during printing and projection.

Another modifications may be made in the filter to compensate for the angle at which the rays reach the portion of the emulsion layers farthest from the optical axes of the lenticules. As shown in Fig. 1, rays from the side of the aperture remote from the optical axis of the lenticule reach the emulsion layers at more oblique angles than those rays which come from the side next to the axis. This causes more spreading of the more oblique rays into the adjacent areas of the emulsions. In order to overcome this spreading, it is necessary in practice to make the filter bands wider on the outer side of the stop, so that the filter assumes an unsymmetrical form.

A still further modification may be made in the filter to compensate for the incorrect spectral absorption of the filter dyes. In the example in which the filter has green and yellow portions, the central portion being clear, green light, for example, should be transmitted equally by the green, yellow and clear portions. It is well known, however, that most green and yellow dyes absorb some green light, and this means that less green light is transmitted by the colored portions of the filter than by the clear, central portion. With a high gamma process it is necessary to compensate for this so that the density of the filter to green light is uniform across the full width of the aperture. This can be accomplished by inserting a compensating neutral density in the clear, central portion of the filter. For example, if the green and yellow filter bands each have a density of .15 to green light, a neutral density of .15 would be inserted in the clear portion of the filter. Similar correction can be made for the red light absorption of the yellow filter band, if necessary.

The emulsion layers coated on the lenticular film may be gelatino-silver halide layers or layers of silver halide in other colloid, sensitized in any suitable manner well known in the art. While the sensitivity arrangement described above, that is, green-sensitive emulsion nearest the support, red-sensitive emulsion in the middle and blue-sensitive emulsion outermost is preferred, other sensitivity arrangements can be used. Either the red-sensitive or the blue-sensitive emulsion might be nearest the support and either the green-sensitive or the red-sensitive emulsion might be outermost or farthest from the support. In the preferred embodiment where the blue-sensitive emulsion is outermost, an emulsion is used which is highly sensitive or of high speed while the green-sensitive and red-sensitive emulsions are much slower in blue speed so that the blue light which records in the blue-sensitive emulsion has no appreciable effect on the red-sensitive and green-sensitive emulsions.

The images produced in these layers are the customary subtractive color images and may be produced by color development as described, for example, in Mannes, Godowsky and Wilder U. S. Patent 2,252,718 or Jelley and Vittum U. S. Patent 2,322,027. The couplers or dye-forming components may be located either in the developing solution as in the former patent or in the emulsion layers as in the latter patent.

Other modifications in the method of my invention will be apparent to those skilled in the art and the invention is to be considered limited only by the scope of the appended claim.

What I claim is:

The method of printing stereo color separation images onto a lenticular film having a plurality of superposed emulsion layers separately sensitive to different spectral regions, which comprises focussing a colored stereo separation image in one of the emulsion layers of said lenticular film, inserting in the system between said stereo separation image and said lenticular film a filter having at least one pair of linear bands of the same color and having a clear central portion, the outermost bands comprising a pair and absorbing light to which the emulsion layer farthest from the lenticules is effectively sensitive, said filter being in a position in the system to absorb light to which the emulsion layers in which the stereo separation image is not focussed are effectively sensitive, printing the stereo separation image onto said lenticular film, and then printing the other stereo separation image onto an adjacent area of the emulsion layers in the same manner as before.

References Cited in the file of this patent

UNITED STATES PATENTS

| | | |
|---|---|---|
| 1,849,473 | Berthon | Mar. 15, 1932 |
| 1,960,373 | Dreyer | May 29, 1934 |
| 2,138,097 | Heymer | Nov. 29, 1938 |
| 2,177,417 | Eggert et al. | Oct. 24, 1939 |
| 2,588,615 | Capstaff | Mar. 11, 1952 |